United States Patent [19]

Nakayama et al.

[11] Patent Number: 4,844,978
[45] Date of Patent: * Jul. 4, 1989

[54] MAGNETIC RECORDING MEDIUM

[75] Inventors: Masatoshi Nakayama; Yasufumi Takasugi; Kunihiro Ueda, all of Tokyo, Japan

[73] Assignee: TDK Corporation, Tokyo, Japan

[*] Notice: The portion of the term of this patent subsequent to Jun. 7, 2005 has been disclaimed.

[21] Appl. No.: 795,433

[22] Filed: Nov. 6, 1985

[30] Foreign Application Priority Data

Nov. 9, 1984 [JP] Japan .............................. 59-236155
Nov. 12, 1984 [JP] Japan .............................. 59-238082
Nov. 13, 1984 [JP] Japan .............................. 59-239249

[51] Int. Cl.$^4$ .............................................. G11B 5/64
[52] U.S. Cl. .................................... 428/336; 427/41; 427/128; 427/131; 428/694; 428/900
[58] Field of Search ................... 428/694, 900, 336; 427/41, 129, 128, 131

[56] References Cited

U.S. PATENT DOCUMENTS

| 4,419,404 | 12/1983 | Aerai | 428/336 |
| 4,429,024 | 1/1984 | Memo | 427/41 |
| 4,565,734 | 1/1986 | Arai | 428/336 |
| 4,582,746 | 4/1986 | Shirahata | 428/695 |

Primary Examiner—Paul J. Thibodeau
Attorney, Agent, or Firm—Oblon, Spivak, McClelland, Maier & Neustadt

[57] ABSTRACT

In a magnetic recording medium comprising a substrate, a ferromagnetic metal thin film formed on the substrate, and a topcoat formed on the thin film, the topcoat is a plasma-polymerized film containing carbon and hydrogen in an atomic ratio of C/H of from 1 to 6, and having a thickness of 10 to 40 angstroms and a contact angle with water in the range of from 60° to 130°.

11 Claims, 1 Drawing Sheet

1

MAGNETIC RECORDING MEDIUM

BACKGROUND OF THE INVENTION

Field of the Invention

This invention relates to magnetic recording media, and more particularly, to improvements in magnetic recording media having a magnetic layer of the continuous thin film type.

Discussion of the Background

Among magnetic recording media for use in video, audio and other applications, active research and development work has been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process in which cobalt and optional elements are evaporated and directed at a given angle with respect to the normal to the substrate because such evaporated films exhibit superior characteristics. The evaporated magnetic layers, however, have many disadvantages including high dynamic friction, low film strength, rough head contact, and low runnability (that is, the durability of tape which travels in frictional contact with rigid members in a video equipment) resulting in reduced output after repeated travels. In the case of video application, the evaporated magnetic layers exhibit a short life time when operated in the still mode (to be simply referred to as "still life", hereinafter). In addition, there occur many dropouts in such layers.

Under these circumstances, a variety of topcoats have heretofore been proposed which cover obliquely evaporated magnetic layers. Exemplary of the topcoat are coatings of plasma-polymerized hydrocarbons as disclosed in Japanese Patent Application Kokai Nos. 59-72653, 59-154641 and 59-160828 and U.S. Pat. No. 4,429,024. However, topcoats of plasma-polymerized hydrocarbons formed by the conventional methods are not fully satisfactory, exhibiting insufficient corrosion resistance, low runnability, diminishing reproduction output, and low strength.

SUMMARY OF THE INVENTION

It is an object of the present invention to provide an improved magnetic recording medium having high corrosion resistance, runnability and strength.

The present invention is directed to a magnetic recording medium comprising a substrate, a ferromagnetic metal thin film formed on the substrate, and a topcoat formed on the thin film. According to the present invention, the topcoat comprises a plasma-polymerized film containing carbon and hydrogen in an atomic ratio of carbon to hydrogen of from 1 to 6. The polymerized film has a thickness of 10 to 40 angstroms and a contact angle with water in the range from 60° to 130°.

In one preferred embodiment, the hydrogen is partially substituted with fluorine such that the atomic ratio of carbon to hydrogen is from 2 to 8 and the atomic ratio of fluorine to hydrogen is from 1.0 to 3.0, and the polymerized film has a contact angle with water in the range from 100° to 130°.

In another embodiment, the atomic ratio of fluorine to hydrogen measured at the top surface of the topcoat is higher than that measured at a level in the topcoat spaced one third of its total thickness from its surface adjacent the ferromagnetic metal thin film by a factor of at least 1.5.

In a further embodiment, the plasma-polymerized film is prepared by feeding a gaseous reactant into a plasma zone with W/F·M set to $10^7$ to $10^{12}$ joule/kg wherein W is an input power applied for plasma generation, F is a flow rate of the gas reactant, and M is the molecular weight of the gas reactant.

BRIEF DESCRIPTION OF THE DRAWING

The FIGURE is a schematic view of a plasma polymerizing apparatus.

DETAILED DESCRIPTION OF THE INVENTION

Figure 1:
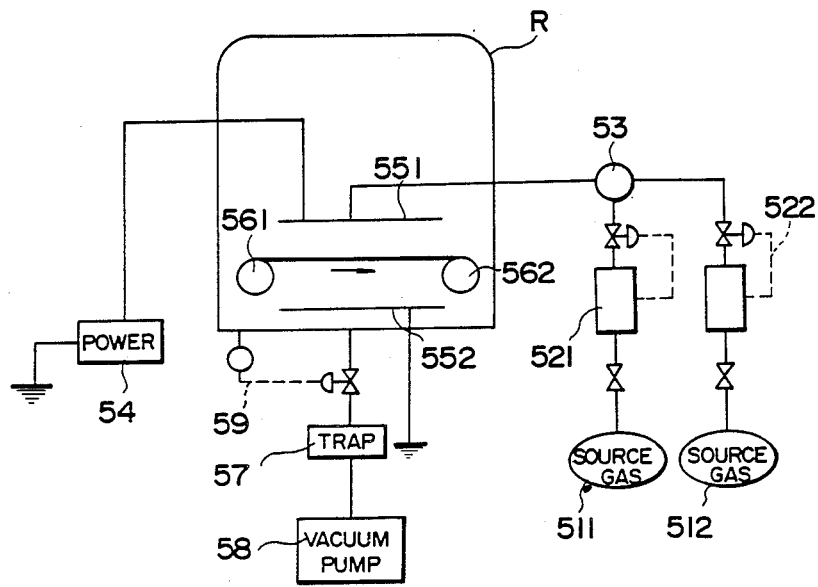

The plasma-polymerized film forming the topcoat in the magnetic recording medium of the present invention is a thin film containing carbon and hydrogen.

Exemplary of the source gas from which the film is plasma polymerized there may be given saturated and unsaturated hydrocarbons, for example, methane, ethane, propane, butane, pentane, ethylene, propylene, butene, butadiene, acetylene, methylacetylene, and the like, and mixtures thereof. Preferably, they are gaseous at room temperature because of ease of operation. If desired, a hydrocarbon which is liquid at room temperature may be used as the source material for plasma polymerization. The source material may optionally contain a minor proportion of nitrogen, oxygen, boron, phosphorus, etc.

The plasma-polymerized film has a thickness of 10 to 40 Å, preferably 15 to 30 Å. In magnetic recording media of the continuous thin film type, when a plasma-polymerized film has a thickness in excess of 40 Å, the spacing loss (magnetic loss due to thickness component) becomes too much and the magnetic flux density is lowered. The head gap is more frequently clogged and a considerable output reduction occurs after repeated passes. Thicknesses less than 10 Å are too thin to provide corrosion resistance and runnability.

Control of film thickness in forming a plasma-polymerized film may be done by controlling reaction time, web moving speed, source gas flow rate and other factors. Control should be done so as to produce a magnetic recording medium having a reduced spacing loss, and high corrosion resistance, runnability, and film rupture strength.

The plasma-polymerized film is prepared by using the above-mentioned hydrocarbon as a source gas, creating a discharge plasma of the gas, and contacting the plasma with the magnetic layer.

The principle of plasma polymerization will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into a highly ionized state. This is generally called a plasma. Since gaseous molecules have a less chance of collision with electrons and little absorb energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of chemical reaction such as polymerization while being kept relatively unchanged from the original. The present invention utilizes this state to form a plasma-polymerized film on a magnetic layer on a base film. The low temperature plasma has no adverse effect on the base film and the magnetic layer.

The FIGURE illustrates a typical apparatus in which a plasma-polymerized film is formed on the surface of a base film having a magnetic layer thereon. This plasma apparatus uses a variable frequency power source. The apparatus comprises a reactor vessel R into which reactant gases are introduced from sources 511 and 512 through mass flow controller 521 and 522, respectively. A single gas may be fed from a single source. When it is desired to use different gases from the sources 511 and 512, they are mixed in a mixer 53 before they are introduced into the vessel. The source gases may be fed at a flow rate of 1 to 250 ml per minute.

Disposed in the reactor vessel R is means for supporting the base web, in this embodiment, a set of supply and take-up rolls 561 and 562 on which the web is wound. Depending on the particular shape of the magnetic recording medium base web, any desired supporting means may be used, for example, a rotary support apparatus on which the base film rests.

On the opposed sides of the web are located a pair of electrodes 551 and 552, one electrode 551 being connected to a variable frequency power source 54 and the other electrode 552 being grounded.

The reactor vessel R is further connected to a vacuum system for evacuating the vessel, including a liquefied nitrogen trap 57, a vacuum pump 58, and a vacuum controller 59. The vacuum system has the capacity of evacuating and keeping the reactor vessel R at a vacuum of 0.01 to 10 Torr.

In operation, the reactor vessel R is first evacuated by means of the vacuum pump 58 to a vacuum of $10^{-3}$ Torr or lower before a source gas or gases are fed into the vessel at a given flow rate. Then the interior of the reactor vessel is maintained at a vacuum of 0.01 to 10 Torr. A take-up roll motor (not shown) is turned on to transfer the web. When the speed of transfer of the web and the flow rate of the gas mixture become constant, the variable frequency power 54 is turned on to generate a plasma with which a plasma-polymerized film is formed on the travelling web.

A carrier gas may be used, for example, Ar, $N_2$, He, and $H_2$.

Preferably, the plasma polymerized film is prepared by feeding a gaseous reactant into a plasma zone with $W/F \cdot M$ set to $10^7$ to $10^{12}$ joule/kg wherein W is an input power applied for plasma generation as expressed in joule/sec., F is a flow rate of the gas reactant as expressed in kg/sec., and M is the molecular weight of the gas reactant. If $W/F \cdot M$ exceeds $10^{12}$, the underlying magnetic layer or web is too adversely affected. If $W/F \cdot M$ is less than $10^7$, the resulting plasma-polymerized film is insufficiently dense to provide corrosion resistance.

The remaining parameters such as applied current and treating time may be as usual and properly chosen without undue experimentation.

Plasma generation may be conducted by another means such as microwave discharge, direct current discharge, and AC discharge in addition to the above-mentioned high frequency discharge.

The thus formed plasma-polymerized film contains carbon and hydrogen in an atomic ratio of carbon to hydrogen (C/H) in the range of from 1 to 6. A plasma-polymerized film having such a C/H ratio exhibits outstandingly improved corrosion resistance and durability. C/H ratios less than 1 provide films practically unacceptable in corrosion resistance, durability and strength. A substantial reduction in output occurs after repeated cycles at C/H ratios higher than 6.

It should be noted that the C/H ratio may be determined by SIMS (secondary ion mass spectroscopy), for example. When SIMS is used, the C/H ratio of the present topcoat film having a thickness of 10 to 40 Å may be calculated by determining the counts of C and H at the topcoat film surface. Alternatively, the C/H ratio may be calculated by determining the profile of C and H while effecting ion etching with Ar or the like. The measurement of SIMS may be in accord with the article "SIMS and LAMMA" in the Surface Science Basic Lectures, Vol. 3, 1984, Elementary and Application of Surface Analsis, page 70.

The thus prepared plasma-polymerized film should have a contact angle with water in the range from 60° to 130°. Plasma-polymerized films having a contact angle of smaller than 60° are practically unacceptable in durability and corrosion resistance. Plasma-polymerized films having a contact angle of greater than 130° are difficult to produce as a hydrocarbon film and unnecessary for actual applications.

A proper contact angle of a plasma-polymerized film with water may be obtained by empirically determining the type and flow rate of source gas(es) and plasma polymerization conditions.

In another preferred embodiment wherein the topcoat film contains fluorine in addition to carbon and hydrogen, the source gases used are fluorohydrocarbons which are gaseous at room temperature, such as fluoromethane, difluoromethane, trifluoromethane, difluoroethane, tetrafluoroethane, etc. and mixtures thereof; at least one fluorocarbon such as tetrafluoromethane, octafluoropropane, octafluorocyclobutane, tetrafluoroethylene, hexafluoroethylene, etc. and at least one hydrocarbon such as methane, ethane, propane, butane, pentane, ethylene, propylene, butene, butadiene, acetylene, methylacetylene, etc.; and mixtures of any of the foregoing compounds.

Another fluoride such as boron fluoride, nitrogen fluoride, silicon fluoride, etc. may also be used as one source material in admixture with the above-mentioned source gas. If desired, use may also be made of Freon 12, Freon 13B1, Freon 22, etc. which are liquid or solid at room temperature.

When more than one source gas is used, the flow rate F and molecular weight M used in the calculation of $W/F \cdot M$ are combined flow rate and molecular weight of the gases.

The plasma-polymerized film is prepared by using the above-mentioned fluorohydrocarbon, hydrocarbon, and fluorocarbon in any suitable combination as a source gas, generating a discharge plasma in the gas, and contacting the gas plasma with the magnetic layer to form a polymerized film thereon.

The resultant topcoat film contains carbon and hydrogen in an atomic ratio of from 2 to 8, preferably from 3 to 5. C/H atomic ratios of less than 2 result in insufficient corrosion resistance whereas C/H ratios of greater than 8 result in a substantial output reduction after repeated passes, both unacceptable in practical uses.

The topcoat film also contains hydrogen and fluorine in an atomic ratio of from 0.3 to 1.0, preferably from 0.5 to 0.9. H/F ratios less than 0.3 result in a substantial output reduction after repeated passes whereas H/F ratios greater than 1.0 provide a too high initial friction for practical use.

It should be noted that the C/H and H/F ratios may be determined by SIMS (secondary ion mass spectroscopy) as mentioned above. When SIMS is used, the C/H and H/F ratios of the present topcoat film having a thickness of 10 to 40 Å may be calculated by determining the counts of C, H and F at the topcoat film surface. Alternatively, these ratios may be calculated by determining the profile of C, H and F while effecting ion etching with Ar or the like.

In a further preferred embodiment of the present invention, the fluorine/hydrogen atomic ratio of the plasma-polymerized film has a concentration gradient in a film thickness direction of film thickness. Such a graded fluorine concentration provides improved corrosion resistance and minimizes head adherence and clogging.

Preferably, the atomic ratio of fluorine to hydrogen measured at the top surface of the topcoat is higher than that measured at a level in the topcoat spaced one third of its total thickness from its surface adjacent the ferromagnetic metal thin film by a factor of at least 1.5. Specifically, the F/H atomic ratio at the surface ranges from 1.5 to 3.0 and the F/H atomic ratio at a level in the topcoat spaced one third of its total thickness from its lower surface, that is, surface adjacent to the ferromagnetic thin film ranges from 1.0 to 1.5. Then the ratio of the former to the latter is 1.5 or higher.

The concentration gradient may be continuous or discontinuous.

The concentration gradient of fluorine/hydrogen atomic ratio existing in the plasma-polymerized film in its thickness direction may be measured by the following procedure, for example.

At first, the plasma-polymerized film is subject to elemental analysis by SIMS while ion etching the film at a constant rate. The time is measured until the ferromagnetic metal thin film is reached (detectable by the generation of a metal ion of which the metal thin film is formed). The time required to etch the polymerized film throughout its thickness is then obtained (total measurement time). Elemental analysis of the film at a point of time when two thirds of the total measurement time has passed from the start is measured by SIMS. In this way, there is obtained the fluorine/hydrogen atomic ratio at a level in the topcoat spaced one third of its total thickness from its surface adjacent the ferromagnetic metal thin film. Elemental analysis of the topcoat film at its top surface is readily measurable by SIMS. The fluorine/hydrogen concentration gradient is then given as the ratio of F/H ratio at the surface to the one third level.

Alternatively, the composition ratio of the plasma-polymerized film may be calculated by measuring the composition profile by SIMS.

The thickness of the plasma-polymerized film may be measured by means of an ellipsometer.

The thus prepared plasma-polymerized film consisting essentially of carbon, hydrogen and fluorine should have a contact angle with water in the range from 100° to 130°, preferably 110° to 120°. Such plasma-polymerized films having a contact angle of smaller than 100° are less preferred because of increased initial friction. Plasma-polymerized films having a contact angle of greater than 130° are difficult to produce as a film and unnecessary for actual applications.

A proper contact angle of a plasma-polymerized film with water may be obtained by empirically determining the type and flow rate of source gas(es) and plasma polymerization conditions.

The magnetic recording medium of the present invention has a magnetic layer on a substrate.

The substrates are not particularly limited as long as they are non-magnetic. Particularly perferred are flexible substrates, especially of resins, for example polyesters such as polyethylene terephthalate and polyimides. They are not limited in shape, size, and thickness as long as they meet the intended application. Preferably, the flexible substrates have a thickness of about 5 to 20 $\mu$m.

The magnetic layer is of continuous ferromagnetic metal thin film type coextending over the substrate and is generally based on cobalt. In preferred embodiments of the present invention, the magnetic layer may preferably consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than about 0.5, and more preferably from about 0.05 to 0.5.

Better results are obtained when the ferromagnetic metal thin film layer contains chromium in addition to cobalt; cobalt and nickel; cobalt and oxygen; or cobalt, nickel, and oxygen. The presence of chromium contributes to further improvements in elecromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees with respect to the normal to the major surface of the substrate. Each columnar particle generally extends throughout the thickness of the thin film layer and has a minor diameter of the order of 50 to 500 angstroms. Cobalt and optional metals such as nickel and chromium form the columnar structure particles themselves while oxygen, when added, is generally present on the surface of each columnar structure particle essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Appl. Phys.*, 36, 3,972 (1965) and Y. Maezawa et al., "Metal thin film video tape by vacuum deposition", IERE Conference Proceedings 54 (The Fourth International Conference on Video and Data Recording, The University of Southanmpton, Hampshire, England, Apr. 20-23, 1982), pp. 1-9.

The ferromagnetic metal thin film layer may be formed on the substrate either directly or via an undercoat layer of the well-known type. Further, the ferromagnetic metal thin film layer is generally formed as a single layer, but in some cases, it may be made up from a plurality of laminated sub-layers with or without an intermediate non-ferromagnetic metal thin film layer interposed therebetween.

The ferromagnetic metal thin film layer may be formed by any well-known techniques including evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inner atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry Treatment (a) Energy particle treatment

Oxygen may be directed as energy particles to the magnetic layer at the final stage of evaporation process by means of an ion gun or neutron gun as described in Japanese Patent Application No. 58-76640.

(b) Glow treatment

The magnetic layer is exposed to a plasma which is created by generating a glow discharge in an atmosphere containing $O_2$, $H_2O$ or $O_2+H_2O$ in combination with an inert gas such as Ar and $N_2$.

(c) Oxidizing gas

An oxidizing gas such as ozone and heated steam is blown to the magnetic layer.

(d) Heat treatment

Oxidation is effected by heating at temperatures of about 60° to 150° C..

(2) Wet Treatment (a) Anodization
(b) Alkali treatment
(c) Acid treatment
  Chromate treatment, permanganate treatment, phosphate treatment
(d) Oxidant treatment
  $H_2O_2$

BENEFITS OF THE INVENTION

According to the present invention, there is formed on a magnetic layer in the form of a ferromagnetic metal thin film a plasma-polymerized film containing carbon and hydrogen in an atomic ratio of C/H from 1 to 6, the plasma-polymerized film having a thickness of 10 to 40 Å and a contact angle with water of 60° to 130°. The resulting magnetic recording medium is an improved high density magnetic recording medium operable with little spacing loss and having high corrosion resistance. The magnetic recording medium of the present invention is also characterized by a very high rupture strength.

When the plasma-polymerized film contains fluorine in addition to carbon and hydrogen in the above-specified ratios, it has additional advantages of reduced dynamic friction, improved runnability and improved corrosion resistance. When the plasma-polymerized film has the above-specified fluorine gradient, it offers corrosion resistance and substantially eliminates head adherence and clogging.

Plasma polymerization, which is a gas phase reaction, provides a highly crosslinked thin film which appears to take a great role in improving rust prevention. Since plasma polymerization allows for continuous high-speed production, it can be readily incorporated in the current magnetic recording medium fabricating process or line without sacrifying production efficiency.

The thin film produced by plasma polymerization is significantly improved in the above-mentioned surface properties without sacrifying the magnetic and electric properties and recording density of magnetic recording medium. This improvement is particularly significant as compared with the conventional thin film topcoats.

EXAMPLES

Examples of the present invention are given below by way of illustration and not by way of limitation.

EXAMPLE 1

A polyethylene terephthalate (PET) web of 10 μm thick was moved along a cooling can in a vacuum vessel where a Co-Ni alloy was heated and evaporated by means of an electron beam gun while introducing oxygen. The Co-Ni alloy was vacuum deposited on the PET web. The background pressure in the vessel was set to $5 \times 10^{-5}$ Torr and the presssure was changed to $2 \times 10^{-4}$ Torr after introduction of $O_2$. The incident angle of deposition was continuously decreased from 90° to 30°. The deposited film had a composition of Co 80-Ni 20 on a weight basis and a thickness of about 1500 Å.

The magnetic layer-bearing web was then introduced into another vacuum chamber which was once evacuated to a vacuum of $10^{-3}$ Torr and then charged with $CH_4$ as a gaseous hydrocarbon and Ar as a carrier gas in a volume ratio of 1:1. A plasma was generated in the gas under a gas pressure of 0.1 Torr by applying a high frequency voltage at 13.56 MHz and 500 watts. W/F·M was calculated to be $5 \times 10^8$. A plasma-polymerized film was formed on the magnetic layer in this manner. The thus obtained plasma-polymerized film had a thickness of 25 Å and a C/H ratio of 2.

In this way, a series of topcoat layers were formed on the magnetic layer as shown in Table I.

Elemental analysis of a topcoat layer was made by SIMS while ion etching the topcoat layer with argon.

The samples were measured for various properties as shown below.

Corrosion Resistance

A tape was measured for magnetic flux quantity both at the initial and after it was allowed to stand for 3 days at 60° C. and a relative humidity of 80%. A percent reduction in magnetic flux quantity ($\Delta\phi m/\phi m$, %) per square meter was determined.

Rupture Strength

The strength of a tape was measured at which it was broken by increasing a pulling force.

Output Reduction

A commercial VHS video deck was loaded and operated with a tape. Using a signal of 4 MHz, a reduction (dB) in output after 50 passes was determined.

TABLE I

| Sample No. | Plasma polymerized film | | | | |
|---|---|---|---|---|---|
| | Source | W/F · M, Joule/kq | Thickness, Å | C/H | Contact angle with water, ° |
| 1 | $CH_4$ | $5 \times 10^8$ | 10 | 2.0 | 82 |
| 2 | $CH_4$ | $5 \times 10^8$ | 25 | 2.2 | 85 |
| 3 | $CH_4$ | $2 \times 10^7$ | 30 | 3.2 | 78 |
| 4 | $CH_4$ | $3 \times 10^9$ | 35 | 4.4 | 92 |
| 5 | $CH_4$ | $5 \times 10^8$ | 60 | 3.5 | 84 |
| 6 | $C_2H_6$ | $1 \times 10^{10}$ | 20 | 5.0 | 79 |
| 7 | $CH_4$ | $4 \times 10^8$ | 30 | 4.2 | 105 |
| 8 | $CH_4$ | $2 \times 10^5$ | 20 | 0.6 | 76 |
| 9 | $CH_4$ | $5 \times 10^{13}$ | 15 | 0.8 | 92 |
| 10 | $CH_4$ | $3 \times 10^7$ | 25 | 1.5 | 50 |
| 11 | $CH_4$ | $4 \times 10^8$ | 30 | 8.5 | 79 |
| 12* | — | — | — | — | — |

TABLE I-continued

| Sample No. | Plasma polymerized film | | |
|---|---|---|---|
| | $\Delta\phi m/\phi m$ | Rupture strength kg/mm² | Output reduction, dB |
| 1 | 15 | 4.2 | −0.5 |
| 2 | 18 | 3.9 | −1.0 |
| 3 | 20 | 3.8 | −1.0 |
| 4 | 19 | 4.2 | −0.5 |
| 5 | 16 | 3.8 | −8.0 |
| 6 | 14 | 4.1 | −1.0 |
| 7 | 12 | 4.5 | −0.5 |
| 8 | 38 | 2.6 | −6.0 |
| 9 | 44 | 2.3 | −12.0 |
| 10 | 35 | 3.8 | −8.0 |
| 11 | 17 | 4.0 | −9.0 |
| 12* | 40 | 2.5 | −10.0 |

*Control sample without topcoat

EXAMPLE 2

A polyethylene terephthalate (PET) web of 10 μm thick was moved along a cooling can in a vacuum vessel where a Co-Ni alloy was heated and evaporated by means of an electron beam gun while introducing oxygen. The Co-Ni alloy was vacuum deposited on the PET web. The background pressure in the vessel was set to $5 \times 10^{-5}$ Torr and the presssure was changed to $2 \times 10^{-4}$ Torr after introduction of $O_2$. The incident angle of deposition was continuously decreased from 90° to 30°. The deposited film had a composition of Co 80-Ni 20 on a weight basis and a thickness of about 1500 Å.

The magnetic layer-bearing web was then introduced into another vacuum chamber which was once evacuated to a vacuum of $10^{-3}$ Torr and then charged with gaseous tetrafluoroethylene and $CH_4$ as a gaseous hydrocarbon and $H_2$ as a carrier gas. A plasma was generated in the gas under a gas pressure of 0.1 Torr by applying a high frequency voltage at 13.56 MHz and 1000 watts. W/F·M was calculated to be $6 \times 10^9$. A plasma-polymerized film was formed on the magnetic layer in this manner. The thus obtained plasma-polymerized film (sample No. 24) had a thickness of 40 Å, a C/H ratio of 3.1, and a H/F ratio of 0.7.

In this way, a series of topcoat layers were formed on the magnetic layer as shown in Table II.

Elemental analysis of a topcoat layer was made by SIMS while ion etching the topcoat layer with argon.

The samples were measured for various properties as shown below.

Dynamic Friction

Coefficient of friction of sample tape was determined at 20° C. and a relative humidity of 60%.

Corrosion Resistance

A percent reduction in magnetic flux quantity ($\Delta\phi m/\phi m$, %) per square meter was determined by the same procedure as in Example 1.

Output Reduction

A commercial VHS video deck was loaded and operated with a tape. Using a signal of 4 MHz, a reduction (dB) in output after 100 passes was determined. The output reduction is an indication of runnability.

TABLE II

| Sample | Plasma polymerized film | | |
|---|---|---|---|
| | Thickness | | Contact angle |

TABLE II-continued

Plasma polymerized film

| Sample No. | Source | W/F·M, Joule/kg | Thickness, Å | C/H | H/F | with water, ° |
|---|---|---|---|---|---|---|
| 21 | $CH_4 + C_2F_4$ | $3 \times 10^8$ | 15 | 2.8 | 0.5 | 116 |
| 22 | $CH_4 + C_2F_4$ | $3 \times 10^8$ | 25 | 4.2 | 0.6 | 120 |
| 23 | $CH_4 + C_2F_4$ | $2 \times 10^{10}$ | 30 | 5.1 | 0.4 | 121 |
| 24 | $CH_4 + C_2F_4$ | $6 \times 10^9$ | 40 | 3.1 | 0.7 | 122 |
| 25 | $CH_4 + C_2F_4$ | $2 \times 10^9$ | 60 | 3.5 | 0.7 | 120 |
| 26 | $C_2H_6 + C_3F_6$ | $5 \times 10^7$ | 20 | 4.1 | 0.5 | 122 |
| 27 | $C_3H_8 + CHF_3$ | $4 \times 10^{11}$ | 20 | 4.7 | 0.4 | 128 |
| 28 | $CH_4 + C_2F_4$ | $4 \times 10^{11}$ | 20 | 3.5 | 2.0 | 107 |
| 29 | $CH_4 + C_2F_4$ | $5 \times 10^7$ | 20 | 1.0 | 1.5 | 166 |
| 30 | $CH_4 + C_2F_4$ | $5 \times 10^8$ | 20 | 4.4 | 0.2 | 125 |
| 31 | $CH_4 + C_2F_4$ | $5 \times 10^4$ | 30 | 2.3 | 0.4 | 115 |
| 32 | $CH_4 + C_2F_4$ | $2 \times 10^{13}$ | 35 | 5.7 | 0.5 | 118 |
| 33 | $CH_4 + C_2F_4$ | $7 \times 10^7$ | 25 | 3.8 | 0.4 | 95 |
| 34 | $CH_4 + CF_4$ | $3 \times 10^8$ | 35 | 9.2 | 0.4 | 118 |
| 35* | — | — | — | — | — | — |

| Sample No. | Friction coefficient, μ | $\Delta\phi m/\phi m$ | Output reduction, dB |
|---|---|---|---|
| 21 | 0.19 | 8 | −1.2 |
| 22 | 0.20 | 10 | −1.1 |
| 23 | 0.21 | 12 | −0.9 |
| 24 | 0.18 | 10 | −1.0 |
| 25 | 0.23 | 7 | −8 |
| 26 | 0.18 | 9 | −0.8 |
| 27 | 0.19 | 11 | −1.0 |
| 28 | 0.48 | 10 | −7 |
| 29 | 0.39 | 25 | −11 |
| 30 | 0.17 | 9 | −12 |
| 31 | 0.20 | 33 | −18 |
| 32 | 0.21 | 45 | −19 |
| 33 | 0.53 | 27 | −6 |
| 34 | 0.20 | 11 | −15 |
| 35* | 0.57 | 42 | −17 |

*Control sample without topcoat

EXAMPLE 3

A polyethylene terephthalate (PET) web of 10 μm thick was moved along a cooling can in a vacuum vessel where a Co-Ni alloy was heated and evaporated by means of an electron beam gun while introducing oxygen. The Co-Ni alloy was vacuum deposited on the PET web. The background pressure in the vessel was set to $5 \times 10^{-5}$ Torr and the pressure was changed to $2 \times 10^{-4}$ Torr after introduction of $O_2$. The incident angle of deposition was continuously decreased from 90° to 30°. The deposited film had a composition of Co 80-Ni 20 on a weight basis and a thickness of about 1500 Å.

The magnetic layer-bearing web was then introduced into another vacuum chamber which was once evacuated to a vacuum of $10^{-3}$ Torr and then charged with gaseous trifluoromethane $CHF_3$ and ethylene $C_2H_4$ as a hydrocarbon and $H_2$ as a carrier gas. A plasma was generated in the gas under a gas pressure of 0.05 Torr by applying a high frequency voltage at 13.56 MHz and 750 watts. W/F·M was calculated to be $9 \times 10^8$. A plasma-polymerized film was formed on the magnetic layer in this manner. The thus obtained plasma-polymerized film had a thickness of 15 Å, a C/H ratio of 3.5, and a F/H ratio of 2.2. The F/H atomic ratio of the topcoat (sample No. 41) at its surface is 2.1 times higher than that of the topcoat at a level spaced one third of its total thickness from its surface adjacent the ferromagnetic metal thin film.

In this way, a series of topcoat layers were formed on the magnetic layer as shown in Table III.

Elemental analysis of a topcoat layer was made by SIMS while ion etching the topcoat layer with argon.

The samples were measured for various properties as shown below.

Corrosion Resistance

A percent reduction in magnetic flux quantity ($\Delta\phi m/\phi m$, %) per square meter was determined the same procedure as in Example 1.

Head Clogging

A commercial VHS video deck was loaded and operated with a tape cut to a length corresponding to a recording time of 30 minutes. The number of head cloggings per 10 passes was measured.

TABLE III

Plasma polymerized film

| Sample No. | Source | W/F·M, Joule/kg | Thickness, Å | C/H | F/H | Gradient** |
|---|---|---|---|---|---|---|
| 41 | $C_2H_6 + CHF_3$ | $9 \times 10^8$ | 15 | 3.5 | 2.2 | 2.1 |
| 42 | $C_2H_6 + CHF_3$ | $1 \times 10^9$ | 20 | 4.0 | 2.0 | 2.5 |
| 43 | $C_2H_6 + CHF_3$ | $2 \times 10^{10}$ | 25 | 4.4 | 1.9 | 2.6 |
| 44 | $C_2H_6 + CHF_3$ | $6 \times 10^5$ | 35 | 4.2 | 1.5 | 2.0 |
| 45 | $C_2H_6 + CHF_3$ | $7 \times 10^7$ | 55 | 3.8 | 1.7 | 1.7 |
| 46 | $CH_4 + CF_4$ | $4 \times 10^8$ | 25 | 4.1 | 2.2 | 1.7 |
| 47 | $C_2H_2 + C_3F_6$ | $3 \times 10^9$ | 20 | 3.9 | 1.6 | 1.6 |
| 48 | $C_2H_6 + CHF_3$ | $2 \times 10^8$ | 20 | 3.5 | 1.6 | 1.0 |
| 49 | $C_2H_6 + CHF_3$ | $5 \times 10^8$ | 35 | 1.1 | 1.2 | 1.6 |
| 50 | $C_2H_6 + CHF_3$ | $3 \times 10^{13}$ | 25 | 3.4 | 1.6 | 1.7 |
| 51* | — | — | — | — | — | — |

| Sample No. | Contact angle with water, ° | $\Delta\phi m/\phi m$ | Head clogging |
|---|---|---|---|
| 41 | 122 | 11 | 0 |
| 42 | 119 | 12 | 0 |
| 43 | 118 | 13 | 1 |
| 44 | 120 | 29 | 0 |
| 45 | 116 | 8 | 7 |
| 46 | 119 | 11 | 1 |
| 47 | 120 | 13 | 0 |
| 48 | 121 | 11 | 8 |
| 49 | 116 | 22 | 3 |
| 50 | 115 | 47 | 5 |
| 51* | — | 42 | — |

*Control sample without topcoat
**F/H at the top surface of topcoat divided by F/H at a one-third thickness level in topcoat from the metal thin film.

We claim:

1. In a magnetic recording medium comprising a substrate, a ferromagnetic metal thin film formed on the substrate, and a topcoat formed on the thin film, the improvement wherein the topcoat comprises a plasma-polymerized film consisting of essentially of carbon, hydrogen, and fluorine, the atomic ratio of carbon to hydrogen being from 2:1 to 8:1 and the atomic ratio of fluorine to hydrogen being from 1.0:1.0 to 3.0:1.0 and said plasma-polymerized film being prepared by activating a gaseous reactant to a plasma to generate active species thereof while feeding the reactant into a plasma zone with W/F·M set to $10^7$ to $10^{12}$ joule/kg wherein W is an input power applied for plasma generation, F is the flow rate of the gas reactant, and M is the molecular weight of the gas reactant, whereby the polymerized film has a thickness of from 10 to 40 angstrom and a contact angle with water in the range of from 100° to 130°.

2. The magnetic recording medium of claim 1, wherein the atomic ratio of fluorine to hydrogen measured at the top surface of the topcoat is higher than that measured at a level in the topcoat spaced one-third of its total thickness from its surface adjacent the ferromagnetic metal thin film by a factor of at least 1.5.

3. The magnetic recording medium of claim 1, wherein the ferromagnetic metal thin film is a cobalt base metal thin film.

4. The magnetic recording medium of claim 3, wherein the ferromagnetic metal thin film contains oxygen.

5. The magnetic recording medium of claim 1, wherein the said polymerized film has a thickness of 15 to 30 Å.

6. The magnetic recording medium of claim 1, wherein the said atomic ratio of carbon to hydrogen is from 3:1.0 to 5:1.0.

7. The magnetic recording medium of claim 1, wherein the atomic ratio of fluorine to hydrogen is from 1.11:1.0 to 2.0:1.0.

8. The magnetic recording medium of claim 2, wherein the said factor is from 1.5:1.0 to 3.0:1 0.

9. The magnetic recording medium of claim 1, wherein the said polymerized film has a contact angle with water in the range of from 110° to 120°.

10. The magnetic recording medium of claim 1, wherein the ferromagnetic metal thin film comprises cobalt and nickel.

11. The magnetic recording medium of claim 1, wherein the ferromagnetic metal thin film comprises cobalt, nickel, and oxygen.

* * * * *